United States Patent [19]

Elsner

[11] Patent Number: 4,944,377
[45] Date of Patent: Jul. 31, 1990

[54] SAFETY COUPLING

[75] Inventor: Ernst Elsner, Herbrechtingen, Fed. Rep. of Germany

[73] Assignee: J. M. Voith GmbH, Heidenheim, Fed. Rep. of Germany

[21] Appl. No.: 281,517

[22] Filed: Dec. 8, 1988

[30] Foreign Application Priority Data

Dec. 16, 1987 [DE] Fed. Rep. of Germany ....... 3742658

[51] Int. Cl.$^5$ ............................................. F16D 7/06
[52] U.S. Cl. .................................... 192/56 F; 464/35
[58] Field of Search ...................... 192/56 F, 72, 88 B; 464/35, 37

[56] References Cited

U.S. PATENT DOCUMENTS 4,093,052  6/1978  Falk .................................... 192/88 B
4,264,229  4/1981  Falk et al. ............................. 403/5

FOREIGN PATENT DOCUMENTS 3643287  7/1988  Fed. Rep. of Germany .
1185265  7/1959  France .................................. 464/35
0092824  4/1988  Japan ................................... 464/35

Primary Examiner—Rodney H. Bonck
Assistant Examiner—Andrea Pitts
Attorney, Agent, or Firm—Jeffers, Hoffman & Niewyk

[57] ABSTRACT

According to the invention, a safety coupling, the torque transmission of which takes place as a result of the radial tension of a clamping sleeve which is under high pressure, has a release valve. During a rotation of the shaft relative to the hub, caused by overloading, the release valve is opened, so that the torque transmission is interrupted as a result of a reduction of the pressure in the clamping sleeve. After rotation, the tappet of the release valve is drawn into the release valve, so that the safety coupling can be put into operation again as a result of a pressure buildup, without any destruction or wear occurring.

7 Claims, 1 Drawing Sheet

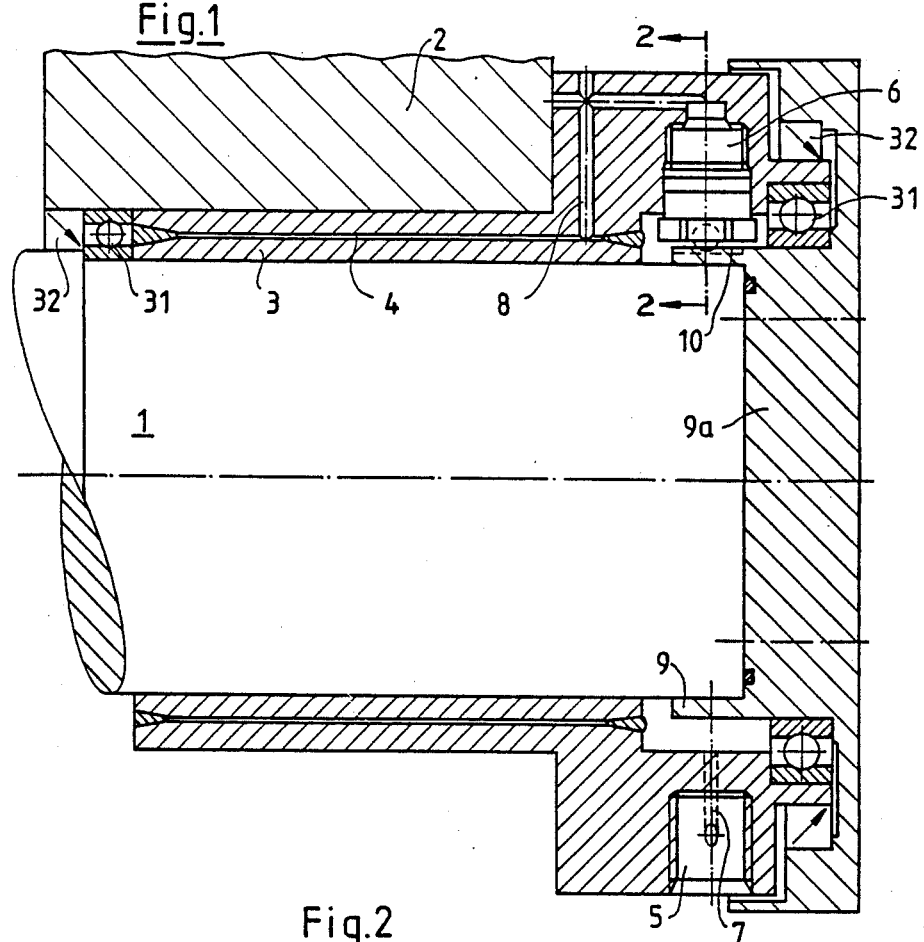
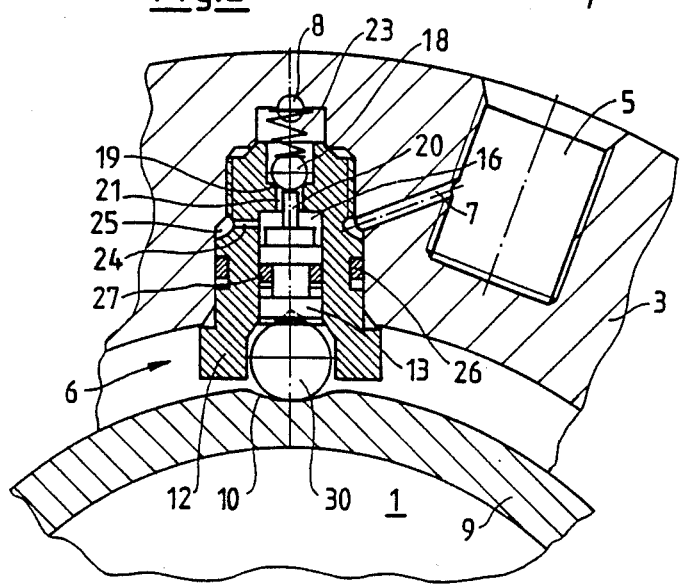

SAFETY COUPLING

The invention relates to a safety coupling for connecting fixedly in terms of rotation two coaxial components, according to the pre-characterizing clause of claim 1.

In a safety coupling known from German Offenlegungsschrift 2,923,902 (=U.S. Pat. No. 4,264,229), torque transmission occurs between a shaft and a hub because, in a sleeve arranged coaxially between the two components, an inner annular chamber is put under radial tension by means of a high-pressure medium. A frictional connection is thereby made on the inner and outer circumferential surfaces. The connection is broken as a result of a reduction of the pressure, particularly, in the version as safety device, when a relative movement occurs after an overloading of the shaft/hub connection as a result of an excessively high torque, necessarily causing the destruction of a closing element of the annular chamber.

To reduce the interruptions in operation and the assembly work arising as a result, it is already been proposed (the unpublished German Offenlegungsschrift 3,643,287.3-12) to connect an automatic valve to the annular chamber. This is opened by a release member in response to a rotation of the hub relative to the shaft caused by an overload, thus preventing further destruction of the coupling. The arrangement of the tappet acting on the valve body is such that, after the valve has been released, the tappet is drawn out of the effective range of the release member by means of a spring. The valve tappet thereby moves radially inwards.

It has been shown that the spring which is intended to move the valve tappet counter to centrifugal force has to be made very strong. On the other hand, however, a large strong spring is inclined, at low speed, to press the tappet too sharply against the valve body which is under internal pressure. The leakproofing of the valve and therefore the reliability of the coupling are therefore not always guaranteed. In particular, however, the known valve design leads to relatively large dimensions, because the release ring surrounding the valve also has to have generous dimensions.

The object of the invention is to increase the reliability of the known release valve and reduce the dimensions, whilst at the same time the wear-free mode of operation must be preserved.

This object is achieved by the use of the characterizing features of claim 1. Accordingly, the release valve is fastened to the hub in such a way that the tappet is directed radially inwards and can move radially outwards, thus causing the valve to open. The following advantage is thereby afforded: the tappet is not under the force of a spring. It can be made more compact and therefore, as a result of centrifugal force, exerts a low and exactly calculable force on the valve body which is under the closing force by means of internal pressure. The valve as a whole can therefore be designed with smaller dimensions.

The design of the release member as a ring with a notch-like pocket, as indicated in claim 2, ensures a support of the tappet relative to the solid shaft, thus achieving a reliable actuation of the valve in the event of rotation without large dimensions involving a high outlay. Because of centrifugal force, the tappet tends to come up against the valve body, so that it enters the pocket without contact with the shaft. Further advantageous embodiments of the invention are given in the remaining subclaims.

The invention is explained in detail below by means of the drawing. In this:

FIG. 1 shows a diagrammatic longitudinal section through a safety coupling with the release valve according to the invention;

FIG. 2 shows a section through the release valve along section line 2—2 of FIG. 1.

FIG. 1 shows a safety coupling with a shaft 1 and a hub 2 and with a clamping sleeve 3 arranged coaxially between them. The clamping sleeve 3 has a narrow annular chamber 4 which extends axially and into which pressure medium can be fed under high pressure via a delivery connection 5, a channel 7, a release valve 6 and a further channel 8. As shown in FIG. 2, the delivery connection 5 is arranged near the release valve 6, but in the drawing is shown diametrically relative to the release valve in the same drawing plane. The exemplary embodiment illustrates the arrangement of the safety coupling on a shaft end, to which a disc 9a is fastened on the end face, with an annular portion designed as a release member 9 and reaching axially into the region of the release valve. This disc also carries one of two bearings 31, by means of which the hub 2 and clamping sleeve 3 are respectively rotatable on the shaft 1 when there is no torque transmission and the annular chamber 4 is relieved. The radially inner cylindrical surface of the clamping sleeve 3 then has virtually no contact with the shaft, thus preventing a destruction of the surfaces. Sealing means preventing lubricant from escaping from the bearings 31 are designated by 32.

FIG. 2 shows a section through the release valve 6 along the sectional line 2—2 of FIG. 1. The release valve 6 is screwed radially from the inside into the thickened region of the end face of the clamping sleeve 3. The valve housing 12 contains an axial bore for an elongated tappet 13. The tappet 13, at its inner end, has an extension 20 which passes through a bore 21 in the valve housing, thereby forming an annular gap, and which is directed towards the valve body 18 designed as a ball. The valve seat for the valve body 18 is designated by 19, a weak stabilising spring 23 ensuring its secure position in the release valve. From the delivery connection 5 located next to the release valve 6, a channel 7 leads to an outer annular channel 25 between the valve housing 12 and the bore in the hub 2, and a bore 24 puts the annular channel 25 into communication with an inner annular channel 16 in the region of the extension 20 on the tappet 13. The channel 8 leading to the annular chamber 4 opens out in the region of the radially outer end face of the valve 6. Sealing means preventing pressure medium from escaping from the annular channels 25 and 16 are designated by 26 and 27 respectively. The sealing means 27 also ensures that the tappet does not move loosely in the valve body.

A rolling body, preferably a ball 30, which is guided in the valve housing 12 is arranged between the notched-like pocket 10 in the annulur release member 9 of the end face of the tappet 13.

When the safety coupling is in the position of rest, the ball 30 enters the pocket 10, the valve body 18 of the release valve stands under pressure on the valve seat 19 via the channel 8, and the tappet 13 lies free of tension between the balls 30 and 18. During rotation, only the centrifugal force of the tappet 13 exerts force on the ball 18, without lifting this off the seat.

During a relative rotation of the shaft 1 in relation to the hub 2, caused by overloading, the ball 30 together with the tappet 3 is pushed radially outwards against the ball 18, so that the pressure is released into the open from the channel 8 or the annular chamber 4 through the bore 21, the annular channel 16, the bore 24, the annular channel 25 and the channel 7. The tappet 13 and the ball 30 can thereby enter the valve 6 completely under the effective centrifugal force, without rubbing against the surface of the annular release member 9 and destroying it. The hub 2 can then rotate freely on the shaft 1 by means of the rolling bearings 31.

To re-establish the rotationally fixed connection, pressure medium is supplied via the delivery connection after the shaft and hub have been brought into the rotational position corresponding to the position of rest. When the pressure increases, the tappet 13 together with the ball 30 is pushed radially inwards into the pocket 10, so that the ball 18 on the valve seat 19 can maintain the high pressure in the annular chamber. The release valve according to the invention thus makes it possible to achieve a reliable and easily maintained actuation of a safety coupling.

I claim:

1. A safety coupling, comprising:
    a shaft;
    a hub disposed coaxially about said shaft, said hub including an annular chamber in fluid communication with an externally communicating fluid connection, the annular chamber being pressurizable by a fluid introducible therein via the fluid connection;
    a release valve fastened to the hub and connected in fluid communication with the annular chamber, said release valve having a valve body and seat and a substantially radially oriented movable actuating member which is movable radially outwardly from an operationally ready position in which the actuating member is at rest and the valve is closed by fluid pressure prevailing in the annular chamber acting on the valve body, to a release position in which the actuating member displaces the valve body and the valve is opened thereby; and
    release member means fastened to the shaft coaxially thereto for moving the movable actuating member of the release valve from the operationally ready position to the release position when, as a result of a torque overload, the release member is displaced with respect to the hub.

2. A safety coupling according to claim 1, in which the release member means has an annular portion with a notch-like pocket which is located on an outer surface into which the actuating member enters when in the operationally ready position.

3. A safety coupling according to claim 1, in which the actuating member is configured as an essentially elongated tappet and is sealingly mounted in the valve, said tappet having a radially inner end reaching into the pocket of the annular portion and having a radially outer end connected to the valve body.

4. A safety coupling according to claim 2, in which the actuating member is configured as an essentially elongated tappet and is sealingly mounted in the valve, said tappet having a radially inner end reaching into the pocket of the annular portion and having a radially outer end connected to the valve body.

5. Safety coupling according to claim 3, in which, after a relative rotation has occurred as a result of an overload, the tappet is pushed radially outward by a flank of the pocket such that the valve body is lifted thereby from its seat causing a pressure fall in the annular chamber, and the tappet and valve body are moved radially outwardly as a result of centrifugal force.

6. Safety coupling according to claim 3, in which a rolling body is disposed between the radially inner end of the tappet and the pocket to make the release operation easier, the rolling body being guided in the valve.

7. Safety coupling according to claim 4, in which a rolling body is disposed between the radially inner end of the tappet and the pocket to make the release operation easier, the rolling body being guided in the valve.

* * * * *